(12) United States Patent
Sun

(10) Patent No.: US 8,775,866 B2
(45) Date of Patent: Jul. 8, 2014

(54) METHOD AND DEVICE FOR READING AND WRITING A MEMORY CARD

(75) Inventor: Shiyou Sun, Guangdong (CN)

(73) Assignee: ZTE Corporation, Shenzhen (CN)

( * ) Notice: Subject to any disclaimer, the term of this patent is extended or adjusted under 35 U.S.C. 154(b) by 220 days.

(21) Appl. No.: 13/375,741

(22) PCT Filed: May 25, 2010

(86) PCT No.: PCT/CN2010/073203
§ 371 (c)(1),
(2), (4) Date: Dec. 1, 2011

(87) PCT Pub. No.: WO2010/139245
PCT Pub. Date: Dec. 9, 2010

(65) Prior Publication Data
US 2012/0084610 A1    Apr. 5, 2012

(30) Foreign Application Priority Data

Jun. 2, 2009 (CN) .......................... 2009 1 0203273

(51) Int. Cl.
G06F 11/00 (2006.01)
(52) U.S. Cl.
USPC .......................................... 714/6.12; 714/6.1
(58) Field of Classification Search
USPC ........ 714/6.1, 6.11, 6.12, 6.13, 6.2, 6.21, 6.3, 714/6.32, 10–13, 4.11
See application file for complete search history.

(56) References Cited

U.S. PATENT DOCUMENTS

| 6,381,662 B1* | 4/2002 | Harari et al. ................... 710/301 |
| 6,851,073 B1* | 2/2005 | Cabrera et al. ................... 714/15 |
| 2005/0177777 A1* | 8/2005 | Seaburg et al. ................. 714/42 |
| 2007/0083355 A1* | 4/2007 | Collins et al. .................... 703/23 |
| 2010/0165808 A1* | 7/2010 | Harada et al. .............. 369/47.15 |

FOREIGN PATENT DOCUMENTS

| CN | 1831786 A | 9/2006 |
| CN | 101216772 A | 7/2008 |
| CN | 101576966 A | 11/2009 |

OTHER PUBLICATIONS

International Search Report dated Sep. 2, 2010 for PCT/CN2010/073203, filed May 25, 2010.
International Preliminary Report on Patentability and Written Opinion dated Dec. 6, 2011 for PCT/CN2010/073203, filed May 25, 2010.

* cited by examiner

*Primary Examiner* — Dieu-Minh Le
(74) *Attorney, Agent, or Firm* — Knobbe, Martens, Olson & Bear, LLP

(57) ABSTRACT

The present invention discloses a method and device for reading a memory card comprising a primary partition and at least one backup partition. The method comprises the following steps that: after writing a first file into the primary partition of the memory card, a read/write device writes the first file into the at least one back partition; and when reading a second file from the memory card, the read/write device reads the second file from the at least one backup partition or from the primary partition if an error occurs in the reading of the second file from the backup partition. The method and device provided herein address the problems existing in the prior art that an embedded system is unstable because of the low error tolerance of a memory card.

8 Claims, 5 Drawing Sheets

METHOD AND DEVICE FOR READING AND WRITING A MEMORY CARD

CROSS-REFERENCE TO RELATED APPLICATIONS

This application is the U.S. National Phase application under 35 U.S.C. §371 of International Application PCT/CN2010/073203 filed May 25, 2010, which claims priority to Chinese Application 200910203273.5 filed Jun. 2, 2009.

TECHNICAL FIELD OF THE INVENTION

The present invention relates to the field of the development of the embedded system and in particular to a method and device for reading and writing a memory card.

BACKGROUND OF THE INVENTION

As a large-capacity storage medium, memory cards, such as compact flash cards (CF cards for short), secure digital memory cards (SD cards for short) and TransFlash cards (TF cards), have been used in many embedded devices. A memory card generally consists of a card controller and a Flash unit, wherein the Flash generally refers to a NAND Flash. The NAND Flash is limited in read/write times (that is, service life), which usually is about 10-100 thousand times. CF card is widely used in communication system devices having high requirement on stability. And SD card and TF card are widely used in portable devices.

A memory card is commonly used in the following way: using a certain kind of file system on the card, such as pHILE, file allocation table (FAT), FAT32, ext2, ext3 and the like, wherein FAT32 is the most widely used one. Software reads a memory card in the form of a file. With a capacity much smaller than a hard disc, a memory card generally has only one partition. This implement scheme can be easily managed but still has the following defects in some applications: (1) Many sections are read frequently during a file access process and are therefore damaged easily, for instance, in a FAT32 file system, the sectors located in a DOS boot record (DBR), FAT1, FAT2 and the directory region are read frequently and therefore most vulnerable to damage. A damage in a frequently-read sector will lead to a failed access to the memory card, which will make a single board run abnormally in an embedded device; (2) Due to the absence of a perfect alarm system, a system will be disabled once a memory card is damaged, leaving no time for maintenance personnel to deal with the problem.

In order to improve the error tolerance of a memory card and the robustness of a system, currently many solutions are provided. For example, (1) employ a backup single board. The backup single board will avoid the problem that a disabled single memory card on a board will disable the whole board in an embedded device, but at a high cost. (2) Use two memory cards on one single board. This solution, although lower in cost than the first solution, is till high in cost, considering the dimensions and the materials of two indispensable cards. Moreover, in this solution the current single boards with one memory card cannot be updated through software to achieve error tolerance protection. (3) Set access control on reading/writing certain key information fields of the file system or freezing certain information regions. Although this solution can reduce the frequency at which a key information region of a memory card is read/written and to reduce the damage probability of the memory card, but it is strictly limited in applications and therefore lacks universality. Moreover, due to the absence of a perfect assistant alarm mechanism, this solution makes no significant improvement in device maintainability.

SUMMARY OF THE INVENTION

The present invention provides a method and device for addressing the problem existing in the prior art that an embedded system is unstable because of the low error tolerance of a memory card.

According to one aspect of the present invention, a method for reading/writing a memory card is provided, wherein the memory card comprises a primary partition and at least one backup partition, and the method comprises the following steps:

when writing the memory card, after writing a first file into the primary partition of the memory card, a read/write device writing the first file into at least one backup partition; and when reading a second file from the memory card, the read/write device reading the second file from the at least one backup partition; if the second file read from the backup partition being erroneous, then the read/write device reading the second file from the primary partition.

According to another aspect of the present invention, a device for reading and writing a memory card is provided, wherein the memory card comprises a primary partition and at least one backup partition, and the device comprises:

a writing unit adapted to write a first file into the primary partition and then write the first file into the at least one backup partition; and a reading unit adapted to read a second file from the at least one backup partition, if the second file read from the backup partition being erroneous, then read the second file from the primary partition.

In accordance with the present invention, a memory card is divided into a primary partition and at least one backup partition so that a read/write device can write a first file into the at least one backup partition after writing the first file into the primary partition. Thus, the purpose of backup protection is realized because the same data are stored in both the primary partition and the backup partition. When reading a second file from the memory card, the read/write device reads the second file from the at least one backup partition or from the primary partition if an error occurs in the reading of the second file from the backup partition, thereby guaranteeing the normal running of a system, improving the error tolerance of the memory card and the stability of the system.

DETAILED DESCRIPTION OF THE EMBODIMENTS

Figure 1:
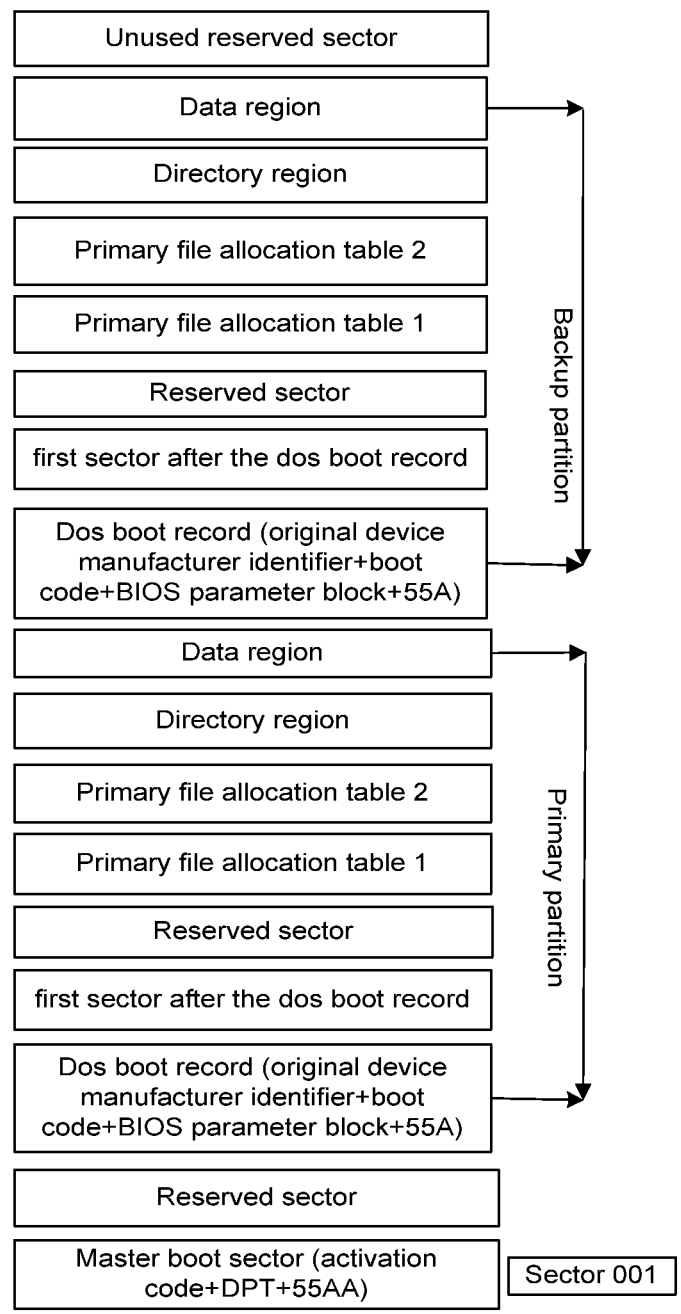
FIG. 1 is a schematic diagram illustrating the formatted partitions of a memory card according to embodiments of the present invention.

In the embodiments of the present invention, for a single board or system with only one memory card, the memory card is divided into a plurality of regions when being formatted and partitioned. The plurality of regions include one primary partition and one or more backup partitions that is/are the same as or different from the primary partition in capacity.

Then, for the single board or system with only one memory card including one primary partition and one backup partition, when writing a first file into the memory card, a read/write device writes the first file first into the primary partition and then into the backup partition. That is, the read/write device writes the first file into the backup partition after writing the first file into the primary partition. Here, in the case where the primary partition and the backup partition have the same capacity, the first file is written into the primary partition and the backup partition in the same way; and in the case where the backup partition has a smaller capacity than the primary partition, the first file is compressed first and then written into the backup partition.

The writing of the first file into the primary or backup partition is ended normally if no hardware error occurs in the primary or backup partition. If a hardware error occurs in either the primary partition or the backup partition, then, only the writing of the first file into the error-free partition is ended normally, and a common alarm is reported to a network manager. If a hardware error occurs in both of the primary partition and the backup partition, then, the first file cannot be written into any of the partitions, and a severe alarm is reported. Common alarm is used for reminding a maintainer of the damage of the primary or backup partition in the memory card and the necessity of a recent memory card replacement. Severe alarm is used for reminding a maintainer that both of the primary and backup partitions in the memory card are damaged and the memory card must be replaced immediately. The hardware error includes: one or more sectors of the memory card are damaged so that a hardware error indication is returned by the controller of the memory card when the memory card is read or written, and there is a malfunction in the controller of the memory card.

In the embodiments of the present invention, when reading a second file from the memory card, the read/write device reads the second file first from the backup partition and ends the reading process normally if the second file can be read from the backup partition correctly. If the second file read from the backup partition is erroneous, then the second file is read from the primary partition. The error occurring in the reading of the second file from the backup partition includes: hardware error and software error.

Thus, if a hardware error occurs in the backup partition during the reading of the second file from the backup partition, a common alarm is reported to the network manager, and then the second file is read from the primary partition. If the second file is read from the primary partition correctly, the reading process is ended normally. Otherwise, a severe alarm is reported to indicate a hardware error occurring in the primary partition.

In the case where a software error occurs during the reading of the second file from the backup partition, the second file is read from the primary partition, and then copied from the primary partition to the backup partition if being read from the primary partition correctly. Then, the reading process is ended normally. The software error includes: an error occurring in the check of the key field of the second file after the reading of the second file, and failure to read the second file. The software error is lower in priority than the hardware error.

The embodiments of the present invention are described below in detail with reference to the drawings.

In embodiments of the present invention, a memory card is formatted into a FAT32 file system with a plurality of sectors, as shown in FIG. 1. In the memory card, there are two partitions with the same size. And, the bottom-up sectors of the formatted memory card are: master boot record (MBR), reserved sector, primary partition, backup partition and unused reserved sector, wherein the primary partition and the backup partition are identical to each other in both capacity and function unit allocation. Here, as the capacity of the memory card is limited, only one primary partition and one backup partition are included in the sectors formatted on the memory card.

In this way, the areas existing in only one part of the whole memory card include: the unused reserved sector, the MBR and the reserved sector. The areas existing in both of the primary and the backup partition include: the DBR of the operating system, the first sector after the DBR, a reserved sector, the FAT1, a backup FAT2, a directory region and a data region, wherein the first sector after the DBR is used for recording the residual capacity of a disc and the initial address of the next idle cluster, and the directory region is used for storing a root directory.

Embodiment 1

Figure 2:
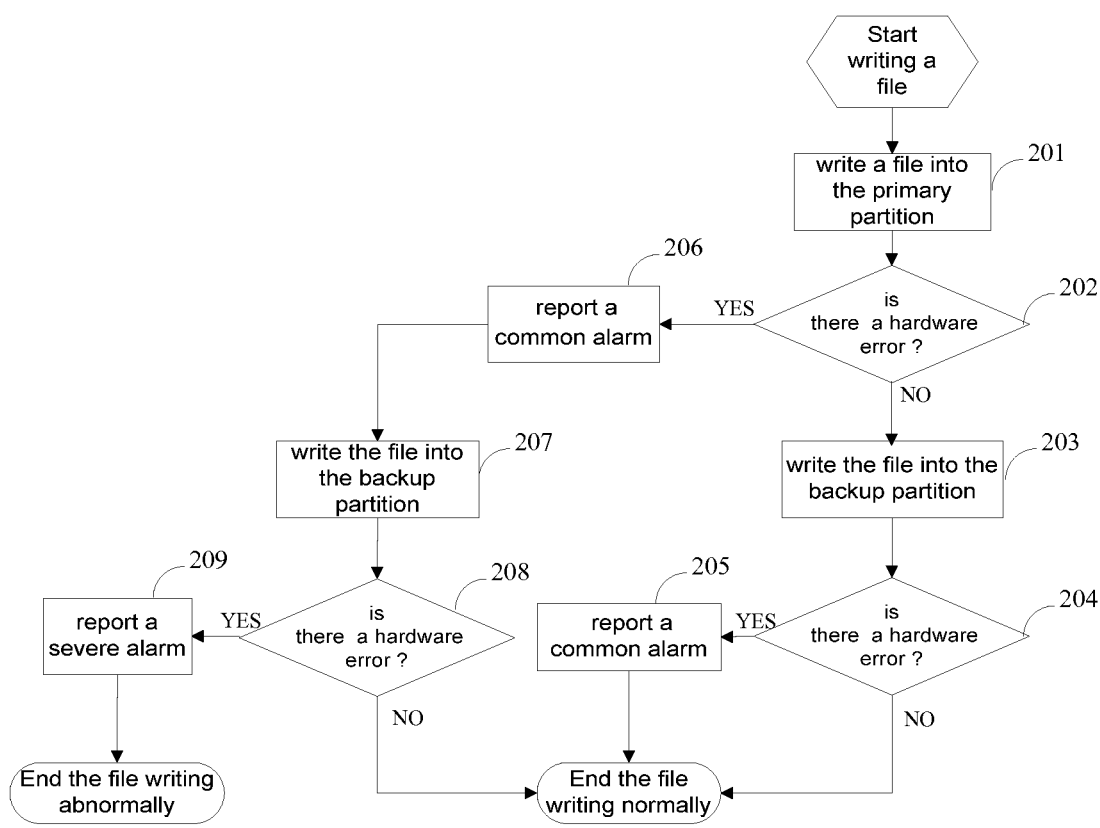
FIG. 2 is a schematic diagram illustrating the writing of a file into a memory card according to a first embodiment of the present invention.

An embedded single board in a communication device comprises the memory card shown in FIG. 1. As shown in FIG. 2, writing a file into the memory card comprises the following steps.

Step 201: write a file into the primary partition.

In the writing flow, a read/write device writes the file into the primary partition first.

Step 202: determine whether there is a hardware error in the primary partition. If so, execute Step 206, otherwise, write the file into the primary partition normally, and then execute Step 203.

During the writing of the file into the primary partition, if the file cannot be normally written into the primary partition due to a hardware error that occurs in the primary partition, then execute Step 206; If no hardware error occurs in the primary partition, write the file into the primary partition normally and then execute Step 203. A hardware error may occur in the following cases: a communication device is suddenly reset or powered off, or the number of write times of the memory card exceeds the upper limit of the service life of a Flash.

Step 203: write the file into the backup partition and then proceed to Step 204.

Step 204: determine whether there is a hardware error in the backup partition. If so, that is, the file cannot be written into the backup partition normally, then execute Step 205; otherwise, that is, the file can be written into the backup partition normally, write the file into the backup partition normally, and then end the file writing flow normally.

Step 205: report a common alarm to the network manager to remind a maintainer of the damage of the backup partition of the memory card and the necessity of a recent memory card replacement.

Although a hardware error occurs in the backup partition, the file has been written into the primary partition normally, and thus, the file writing flow is normally completed as well.

Step 206: report a common alarm to a network manager to remind a maintainer of the damage of the primary partition of the memory card and the necessity of a recent memory card replacement.

Step 207: write the file into the backup partition and then proceed to Step 208.

Step 208: determine whether there is a hardware error in the backup partition. If so, that is, the file cannot be written into the backup partition normally, execute Step 209; otherwise, write the file into the backup partition normally, and then end the file writing flow normally.

Here, a hardware error occurs in the backup partition, that is, both the primary partition and the backup partition are faulted, the file cannot be written into any of the two partitions, thus, the flow turns to Step 209.

In the case where no hardware error occurs in the backup partition, the file, although cannot be written into the primary partition, can still be written into the backup partition, thus, the file writing flow is normally completed as well.

Step 209: report a severe alarm to the network manager to remind a maintainer that damage occurs in both the primary partition and the backup partition of the memory card and the memory card must be replaced immediately.

In this case, the file cannot be written into any of the primary partition and the backup partition, thus, the file writing flow is completed abnormally.

Embodiment 2

Figure 3:
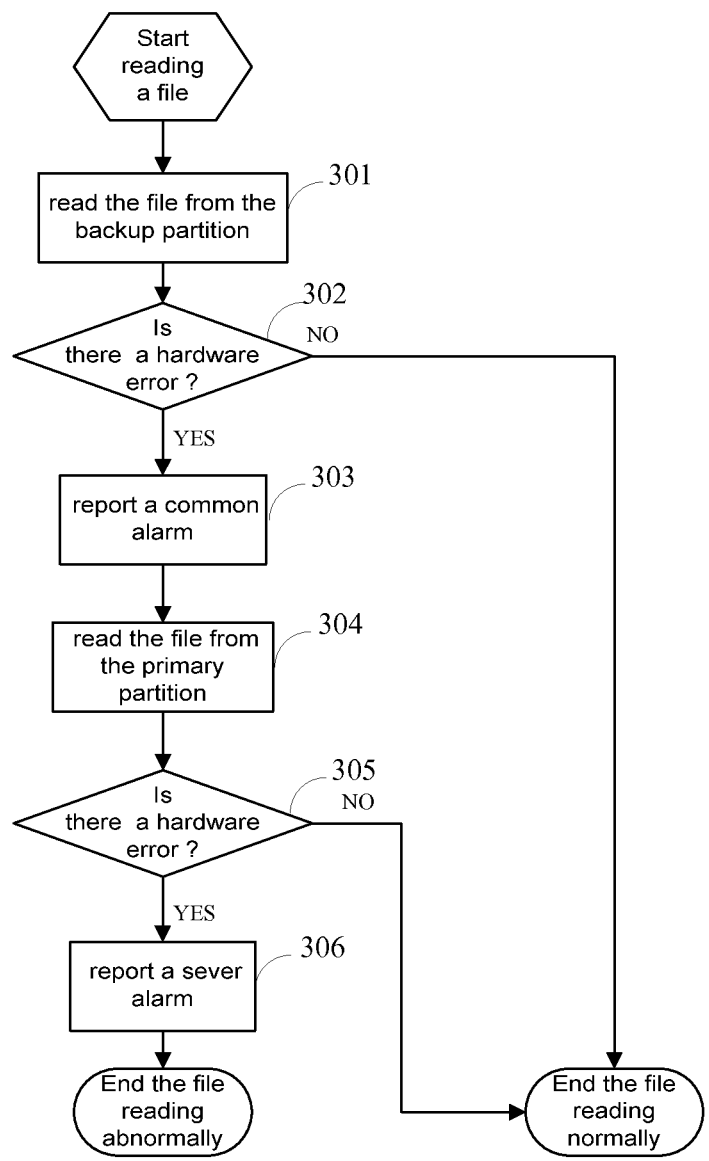
FIG. 3 is a schematic diagram illustrating the reading of a file from a memory card according to a second embodiment of the present invention.

The embedded single board in a communication device comprises the memory card shown in FIG. 1. As shown in FIG. 3, reading a file from the memory card comprises the following steps (in these steps, an error occurring in the reading of the file from the memory card is a hardware error).

Step 301: read a file from the backup partition.

In the reading flow, a read/write device reads the file from the backup partition first.

Step 302: determine whether there is a hardware error in the backup partition. If so, that is, the file cannot be read from the backup partition normally, execute Step 303; otherwise, read the file from the backup partition normally, and then end the file reading flow normally.

Step 303: report a common alarm to a network manager to remind a maintainer of the damage of the backup partition of the memory card and the necessity of a recent memory card replacement.

Step 304: read the file from the primary partition and then proceed to Step 305.

Step 305: determine whether there is a hardware error in the primary partition. If so, that is, the file cannot be read from the primary partition, execute Step 306; otherwise, read the file from the primary partition, and end the file reading flow normally.

Here, if a hardware error occurs in the primary partition, that is, both the primary partition and the backup partition are faulted, the file cannot be read from any of the two partitions; thus, the flow turns to Step 306.

In the case where no error occurs in the primary partition, the file, although cannot be read from the backup partition, can still be read from the primary partition, and thus, the file reading flow is normally completed as well.

Step 306: report a severe alarm to the network manager to remind a maintainer that damage occurs in both the primary partition and the backup partition of the memory card and the memory card must be replaced immediately.

In this case, the file cannot be read from any of the primary partition and the backup partition, thus, the file reading flow is completed abnormally.

Embodiment 3

Figure 4:
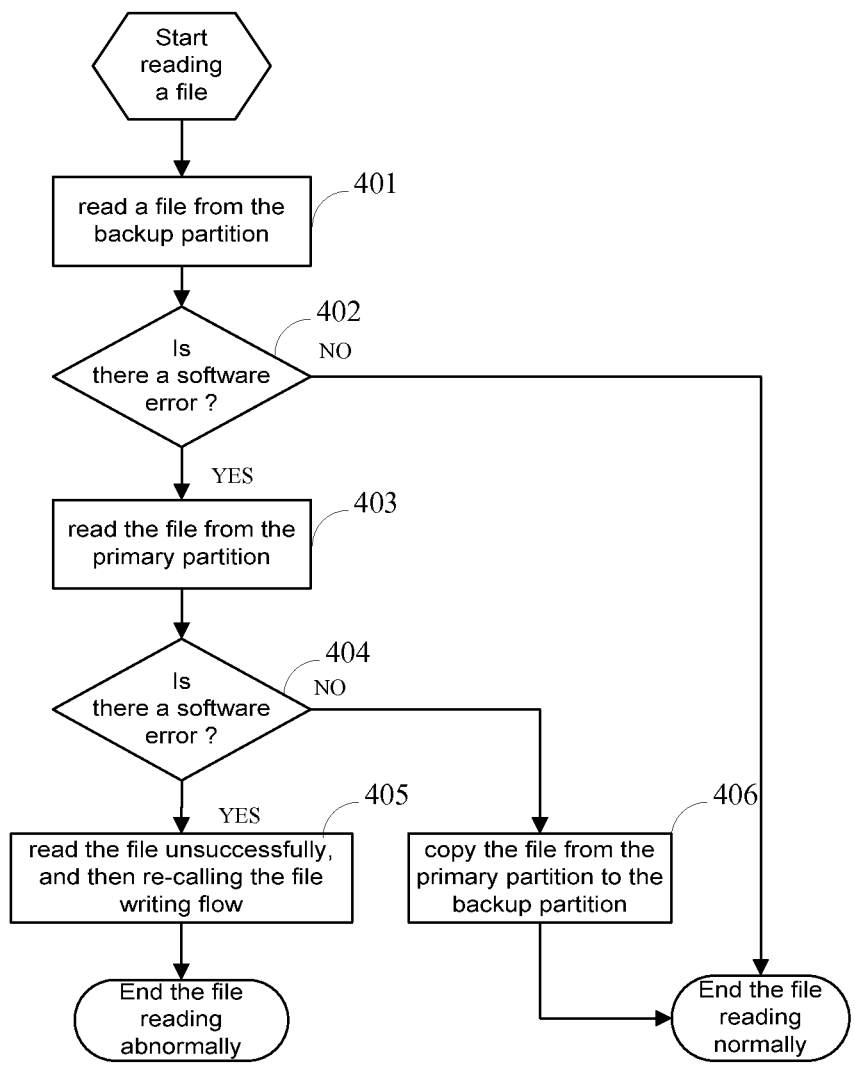
FIG. 4 is a schematic diagram illustrating the reading of a file from a memory card according to a third embodiment of the present invention.

As a hardware error has a higher priority than a software error during a file reading process, this embodiment is a sub-flow of embodiment 2, in which it is assumed that no hardware error occurs during a file reading process. As shown in FIG. 4, the reading of a file from the memory card shown in FIG. 1 comprises the following steps.

Step 401: read a file from the backup partition.

In the reading flow, a read/write device reads the file from the backup partition first.

Step 402: determine whether there is a software error occurring during the reading process. If so, that is, the file cannot be read from the backup partition normally, execute Step 403; otherwise, read the file from the backup partition normally, and then end the file reading flow normally.

It is possible that no file is read from the backup partition or the key field of the file read is checked wrong, that is, a software error occurs and the file cannot be read from the backup partition, then the flow proceeds to Step 403.

Step 403: read the file from the primary partition and then proceed to Step 404.

Step 404: determine whether there is a software error occurring during the reading process. If so, that is, there is a software error and the file cannot be read from the primary partition normally, execute Step 405; otherwise, that is, there is no software error, read the file from the backup partition normally, and then execute Step 406.

Step 405: read the file unsuccessfully, and then re-call the file writing flow.

Here, the file cannot be read from any of the primary partition and the backup partition, thus, the file reading flow is completed abnormally.

Step 406: copy the file from the primary partition to the backup partition.

As a software error occurs in the backup partition after the file is read from the primary partition, the copying of the file from the primary partition to the backup partition guarantees the completeness of the file, so that the file can be read normally in the next reading.

Then, the file, although cannot be read from the backup partition normally, can still be read from the primary partition, and thus, the file reading flow is normally completed as well.

In the aforementioned three embodiments, a file is written first into the primary partition and then into the backup partition during a memory card write process and is read first from the backup partition and then from the primary partition during a memory card read process.

Thus, when the system is suddenly powered off or reset during a file writing process, it may happen that the file is completely written into the primary partition but incompletely written into the backup partition. If the primary partition is read before the backup partition in this case, then the flow will return normally as the primary partition is always read correctly, which makes it undeterminable whether or not the current file exists in the backup partition or whether or not the current file existing in the backup partition is right. As the situation accumulates, many files will be absent in the primary partition or many wrong files will be left in the backup partition. When an error occurs in the primary partition, as the file is wholly switched to the backup partition, the wrong files left in the backup partition will make the backup partition used abnormally. If an attempt is made to address this problem by synchronizing the primary partition with the backup partition, then, the efficiency of the system will be greatly reduced as there are too many files. If the problem is addressed by checking the backup partition every time after the primary partition is read, the efficiency of the system will be reduced as each file needs checking.

However, in embodiments of the present invention, the backup partition is read before the primary partition. If no file or file check error is found during the reading of a file from the backup partition, the primary partition is read. If the reading from the primary partition is correct, then the file is copied to the backup partition from the primary partition, which guarantees the synchronization of the primary and the backup partitions, that is, guarantees the availability of the files stored in the primary and the backup partitions. Consequently, the probability of an after-handover fault occurring is significantly decreased. Moreover, this scheme of only synchronizing one wrong file saves time and improves efficiency, compared with a full-disk backup scheme.

In embodiments of the present invention, the memory card, if provided with enough capacity, may include one primary partition and a plurality of backup partitions, for example, a primary partition, a first backup partition and a second backup partition. In this case, when written into the memory card, a file is written first into the primary partition, then into the first backup partition, and finally into the second backup partition. When read from the memory card, a file is read from the first backup partition first. If this reading is failed, the file is then read from the second backup partition, and if this reading is also failed, the file is read from the primary partition. The first and the second backup partitions can be exchanged.

Here, when written into the memory card, a file is written into the primary partition first. If a hardware error occurs in the primary partition, a common alarm is reported, and then the file is written into the first backup partition. If a hardware error occurs in the first backup partition, a common alarm is reported, and then the file is written into the second backup partition. If a hardware error occurs in the second backup partition as well, a severe alarm is reported to indicate that the file cannot be written into the memory card.

When a file is read from the memory card, it is read from the first backup partition first. If a hardware error occurs in the first backup partition, a common alarm is reported, and then the file is read from the second backup partition. If a hardware error occurs in the second backup partition, a common alarm is reported, and then the file is read from the primary partition. If a hardware error occurs in the primary partition as well, a severe alarm is reported to indicate that the file cannot be read from the memory card.

When a file is read from a memory card having no hardware problem, if a software error occurs in the first backup partition when the file is read from the first backup partition, then, the file is read from the second backup partition. If the reading from the second backup partition is successfully completed, then the file is copied into the first backup partition and the flow is ended. If a software error also occurs in the second backup partition when the file is read from the second backup partition, then, the file is read from the primary partition. If the reading of the file from the primary partition is successfully completed, then the file is copied into the first and/or the second backup partitions, and the flow is ended.

Certainly, if in the embodiment above, the primary partition and the first and the second backup partitions are all different in capacity, during the file writing process, files 1, 2, 5, 6 can be written into the primary partition first and then into the first backup partition, and files 3, 4, 7, 8 can be written into the primary partition and then into the second backup partition. In this way, during a file reading process, the first or second backup partition is read first, and if there is a failure to read the file in the first or second backup partition, the primary partition is read. For instance, during the reading process of file 7, the first backup partition is read first, if file 7 is successfully read from the first backup partition, the flow is ended, otherwise, the primary partition is read.

Certainly, in embodiments of the present invention, the memory card can also be formatted to file systems such as pHILE, FAT, ext2, ext3 and the like, wherein the memory card includes at least two partitions that have the same capacity and format. Moreover, the primary partition can be exchanged with the backup partition, that is, during a memory card read/write process, a file can be written into the backup partition first and then into the primary partition, and read first from the primary partition and then the backup partition. The specific read/write process is not described here repeatedly.

Figure 5:
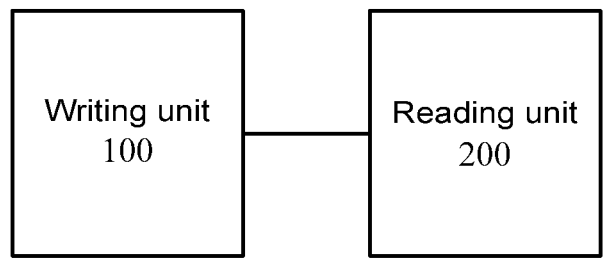
FIG. 5 is a schematic diagram illustrating a device for storing a read/write card according to an embodiment of the present invention.

A device for reading/writing a memory card can be configured according to the aforementioned method for reading/writing a memory card. The device may be an embedded single board on a communication device or a module in a system, for example, a memory unit of a central processing unit (CPU). An embedded single board on a communication device or a memory card in a system is already provided with a primary partition and at least one backup partition when being formatted and partitioned. As shown in FIG. 5, the device for reading/writing a memory card comprises: a writing unit 100 and a reading unit 200.

The writing unit 100 is adapted to write a first file into the primary partition and then write the first file into the at least one backup partition. The reading unit 200 is adapted to read a second file from the at least one backup partition, and then reads the second file from the primary partition if the second file read from the backup partition is erroneous.

When writing the first file into the primary partition, the writing unit 100 checks whether or not there is a hardware error in the primary partition, and reports a common alarm in the case where there is a hardware error in the primary partition. When writing the first file into the backup partition, the writing unit 100 also checks whether there is a hardware error in the backup partition, reports a common alarm if a hardware error occurs only in the backup partition, or reports a severe alarm if an error occurs in both the backup and the primary partitions. In the case where the memory card comprises a plurality of backup partitions, the writing unit 100 writes a first file into one or more backup partitions. The writing unit 100 checks whether a hardware error occurs in the backup partition into which the file is written, and reports a common alarm if a hardware error only occurs in the backup partition, or reports a severe alarm if a hardware error occurs in all the backup partitions and the primary partition.

If a hardware error occurs when the reading unit 200 reads a second file from the memory card, then, when reading the second file from the backup partition, the reading unit 200 checks whether there is a hardware error in the backup partition and reads the second file from the backup partition if there is no hardware error in the backup partition. If there is a hardware error in the backup partition, the reading unit 200 reports a common alarm and then reads the second file from the primary partition. When reading the second file from the primary partition, the reading unit similarly checks whether there is a hardware error in the primary partition, and reads the second file from the primary partition if there is no error in the primary partition, or reports a severe alarm if there is an error in the primary partition as well. In the case where the memory card comprises a plurality of backup partitions, the reading unit 200 first reads the second file from one of the backup partitions, and if there is a hardware error in the backup partition, reports a common alarm, and then reads the second file from another backup partition; if the another backup partition is also subjected to a hardware error, reports a common alarm, and then reads the second file from the primary partition if no error occurs in the primary partition, or reports a severe alarm if there is an error in the primary partition.

If a software error occurs when the reading unit 200 reads a second file from the memory card, then, the reading unit 200 reads the second file from the primary partition when the software error occurs during the reading of the second file from the backup partition. Moreover, after read from the primary partition, the second file is copied from the primary partition to the backup partition. If the memory card comprises a plurality of backup partitions and a software error occurs when the reading unit 200 reads the second file from one backup partition, then, the reading unit reads the second file from another backup partition and then copies the second file into the first backup partition. If the reading of the second file from another backup partition is failed, then the reading unit 200 reads the second file from the primary partition. Moreover, after read from the primary partition, the second file is copied from the primary partition to at least one backup partition.

In conclusion, in embodiments of the present invention, a primary partition and at least one backup partition are formatted on a memory card so that a file can be written into both the primary and the backup partitions. Then, a file system can create two identical frequently-read/written regions automatically and two data regions, thus realizing the backup protection purpose. When a file is read from the memory card, if a backup partition is faulted for some reason, and an error incurred, the primary partition can be immediately switched onto so that data can be read from the primary partition, which guarantees the normal running of the system. Meanwhile, an alarm is reported to a network manager if a hardware error occurs in either of the primary and the backup partitions during the reading/writing process of the memory card to remind a maintainer to replace the memory card timely. If a hardware error occurs in the primary partition and all the backup partitions, a severe alarm is directly reported to remind a maintainer to replace the memory card immediately. Therefore, the maintainability and the robustness of the system are improved.

Apparently, various modifications and variations can be devised by those skilled in the art without departing from the scope and range of the present invention. The present invention is intended to cover such modifications and variations that are within the scope of the claims appended herein or the equivalents thereof.

The invention claimed is:

1. A method for reading and writing a memory card, wherein the memory card comprises a primary partition and at least one backup partition, and the method comprises the following steps:
when a read/write device writing a first file into the memory card, after writing the first file into the primary partition of the memory card, writing the first file into the at least one backup partition; and
when reading a second file from the memory card, the read/write device reading the second file from the at least one backup partition; if the reading of the second file from the backup partition being erroneous, then reading the second file from the primary partition,
wherein if a hardware error occurs in the reading of the second file from the backup partition, reading the second file from the primary partition comprises:
reporting a severe alarm when a hardware error occurs in the reading of the second file from the primary partition.

2. The method according to claim 1, wherein writing the first file into the primary partition comprises:
reporting a common alarm when a hardware error occurs in the primary partition.

3. The method according to claim 2, wherein writing the first file into the at least one backup partition comprises:
reporting a common alarm when a hardware error occurs in the backup partition.

4. The method according to claim 1, wherein if a hardware error occurs in the reading of the second file from the backup partition, then before the second file is read from the primary partition, the method further comprises:
a step of reporting a common alarm.

5. The method according to claim 1, wherein if a software error occurs in the reading of the second file from the backup partition, then after the second file is read from the primary partition, the method further comprises:
a step of copying the second file from the primary partition to the at least one backup partition.

6. A device for reading and writing a memory card, wherein the memory card comprises a primary partition and at least one backup partition, and the device comprises:
a writing unit adapted to write a first file into the primary partition and then write the first file into the at least one backup partition; and
a reading unit adapted to read a second file from the at least one backup partition, if the reading of the second file from the backup partition is erroneous, then read the second file from the primary partition,
wherein the reading unit comprises:
a second check sub-unit adapted to check, when reading the second file, whether a hardware error occurs in the primary partition and/or the at least one backup partition;
a third report sub-unit adapted to report, when reading the second file, a common alarm if a hardware error occurs in the primary partition or the at least one backup partition; and
a fourth report sub-unit adapted to report, when reading the second file, a severe alarm if a hardware error occurs in both the primary partition and the at least one backup partition.

7. The device according to claim 6, wherein the writing unit comprises:
a first check sub-unit adapted to check, when writing the first file, whether a hardware error occurs in the primary partition and/or the at least one backup partition;
a first report sub-unit adapted to report, when writing the first file, a common alarm if a hardware error occurs in the primary partition or the at least one backup partition; and
a second report sub-unit adapted to report, when writing the first file, a severe alarm if a hardware error occurs in both the primary partition and the at least one backup partition.

8. The device according to claim 6, wherein the reading unit comprises:
a backup sub-unit adapted to make a copy of the second file from the primary partition to the at least one backup partition when a software error occurs in the reading of the second file from the backup partition.

* * * * *